United States Patent
Al-Nakhli et al.

(10) Patent No.: US 11,987,747 B2
(45) Date of Patent: May 21, 2024

(54) SAND CONSOLIDATION USING ASPHALTENE/TAR WITH SOLVENTS AND ADSORPTION SYSTEM

(71) Applicant: SAUDI ARABIAN OIL COMPANY, Dhahran (SA)

(72) Inventors: Ayman R. Al-Nakhli, Dhahran (SA); Wajdi M. Buhaezah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/832,135

(22) Filed: Jun. 3, 2022

(65) Prior Publication Data
US 2023/0392068 A1    Dec. 7, 2023

(51) Int. Cl.
*C09K 8/565* (2006.01)
*C09K 8/502* (2006.01)
*C09K 8/518* (2006.01)
*E21B 33/138* (2006.01)
*E21B 43/02* (2006.01)

(52) U.S. Cl.
CPC .............. *C09K 8/565* (2013.01); *C09K 8/502* (2013.01); *C09K 8/518* (2013.01); *E21B 33/138* (2013.01); *E21B 43/025* (2013.01)

(58) Field of Classification Search
CPC ........ E21B 43/02; E21B 43/025; E21B 33/13; E21B 33/138; C09K 8/518; C09K 8/516; C09K 8/50; C09K 8/502; C09K 8/56; C09K 8/565
See application file for complete search history.

(56) References Cited

U.S. PATENT DOCUMENTS

| | | | |
|---|---|---|---|
| 3,209,826 A | 10/1965 | Young | |
| 3,324,947 A | 6/1967 | Gilchrist | |
| 3,567,475 A | 3/1971 | Rostler | |
| 3,689,297 A * | 9/1972 | Dybalski | C08L 95/005 106/280 |
| 3,910,351 A * | 10/1975 | Wu | E21B 43/025 166/276 |
| 4,036,661 A * | 7/1977 | Schmidt | C08K 5/54 106/284.4 |
| 4,494,605 A * | 1/1985 | Wiechel | E21B 43/025 166/276 |
| 4,564,069 A | 1/1986 | Rubinstein et al. | |
| 4,649,998 A | 3/1987 | Friedman | |
| 5,082,057 A | 1/1992 | Sydansk | |
| 5,178,218 A | 1/1993 | Dees | |
| 5,414,029 A * | 5/1995 | Lemoine | C10C 3/026 524/60 |
| 5,428,085 A * | 6/1995 | Burel | C10C 3/026 524/68 |
| 5,721,296 A * | 2/1998 | Mizunuma | C09D 195/005 427/136 |
| 6,363,019 B1 * | 3/2002 | Erickson | G11C 17/18 365/189.05 |
| 6,364,019 B1 | 4/2002 | Aggour et al. | |
| 6,401,819 B1 | 6/2002 | Harris et al. | |
| 8,789,595 B2 | 7/2014 | Guerrero et al. | |
| 11,441,396 B1 * | 9/2022 | Abu-Khamsin | E21B 43/166 |
| 11,549,051 B2 * | 1/2023 | Rizq | C09K 8/40 |
| 2006/0089432 A1 * | 4/2006 | Kawakami | C08L 95/00 524/59 |
| 2010/0139916 A1 | 6/2010 | Aston et al. | |
| 2011/0017461 A1 | 1/2011 | Aston et al. | |
| 2013/0233623 A1 | 9/2013 | Aston et al. | |
| 2016/0376440 A1 * | 12/2016 | Naidoo | C08L 91/00 106/122 |
| 2018/0273829 A1 * | 9/2018 | Al-Nakhli | C09K 8/565 |
| 2019/0093451 A1 * | 3/2019 | Al-Nakhli | C09K 8/44 |
| 2022/0112130 A1 * | 4/2022 | Williams | C04B 26/26 |
| 2023/0034141 A1 * | 2/2023 | Kurth | C08K 5/0025 |

FOREIGN PATENT DOCUMENTS

| | | |
|---|---|---|
| CA | 2637696 C | 3/2010 |
| CN | 111793488 A | 10/2020 |
| JP | 4549453 B2 * | 9/2010 |
| JP | 2010222910 A * | 10/2010 |
| WO | 2002004784 A2 | 1/2002 |

OTHER PUBLICATIONS

McKinsey, Asphaltenes, Energy Insights, retrieved Mar. 30, 23 from https://www.mckinseyenergyinsights.com/resources/refinery-reference-desk/asphaltenes/#:~:text=Asphaltenes%20are%20large%2C%20high%2Ddensity,components%20of%20the%20product%20asphalt. (Year: 2023).*
Translation of JP-2010222910-A (Year: 2010).*
Translation of JP-4549453-B2 (Year: 2010).*

* cited by examiner

*Primary Examiner* — Angela M DiTrani Leff
(74) *Attorney, Agent, or Firm* — Osha Bergman Watanabe & Burton LLP

(57) ABSTRACT

A sand consolidation composition includes a hydrocarbon mixture comprising asphaltene, bitumen, or tar, and a binding agent, where the binding agent is an amino silane, and where the composition has a viscosity ranging from 5 to 20 cP at 20 to 25° C. A method of sand consolidation includes introducing the sand consolidation composition in a wellbore, contacting sand downhole with the sand consolidation composition, maintaining the wellbore such that a viscosity of the sand consolidation composition and the sand increases from an initial viscosity of the sand consolidation composition, introducing a thermochemical reagent comprising sodium nitrite and ammonium chloride such that it intimately intermingles downhole with the sand consolidation composition and releases a gas, and after a period, forming a productive consolidated sand.

7 Claims, No Drawings

SAND CONSOLIDATION USING ASPHALTENE/TAR WITH SOLVENTS AND ADSORPTION SYSTEM

BACKGROUND

"Sanding" in oil production and water injection wells refers to formation sand or fines that is produced with fluids, such as oil and water. Sanding may plug tubing, casing, flowlines, and surface vessels, leading to loss of well control or unwanted fluid emissions.

Under-consolidated formations, such as moderately consolidated or unconsolidated formations include, but are not limited to, sandstone formations. These under-consolidated formations often produce formation sand due to a lack of cementation materials that may bind the sand together. Produced sand may suspend or build up in reservoir fluids. Produced sand has little or no economic value compared to produced oil and gas. Controlling sanding may include costly techniques to mitigate or manage the produced sand.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, embodiments disclosed herein relate to a sand consolidation composition that may comprise a hydrocarbon mixture comprising asphaltene, bitumen, or tar, and a binding agent. The binding agent may be an amino silane, and the composition has a viscosity ranging from 5 to 20 cP at 20 to 25° C.

In another aspect, embodiments disclosed herein relate to a method of sand consolidation that may comprise introducing a sand consolidation composition comprising a binding agent and a hydrocarbon mixture comprising asphaltene, bitumen, or tar, in a wellbore. The wellbore may traverse a formation having under-consolidated sand. The method may further comprise contacting sand downhole with the sand consolidation composition, and maintaining the wellbore such that a viscosity of the sand consolidation composition and the sand increases from an initial viscosity of the sand consolidation composition. The method may further comprise introducing a thermochemical reagent comprising sodium nitrite and ammonium chloride such that it intimately intermingles downhole with the sand consolidation composition and releases a gas. After a period, the method may include forming a productive consolidated sand that is a semi-solid or solid foam product, which is permeable and porous.

In another aspect, embodiments disclosed herein relate to a productive consolidated sand product that may comprise a combination of formation sand, a hydrocarbon mixture comprising asphaltene, bitumen, or tar, and a binding agent. The productive consolidated sand may have a porosity and a permeability. The combination that makes up the productive consolidated sand product may be physically bound by chemical association or covalently bound by chemical bonds.

Other aspects and advantages of the claimed subject matter will be apparent from the following Detailed Description and the appended Claims.

DETAILED DESCRIPTION

Sanding in wells may cause productivity decline compared to wells without excessive sand production. Sanding may damage subsurface equipment through erosion or wear. Sanding may also halt production and require cleanout of wells. If a well becomes clogged with sand or collapses, production may be permanently halted from a portion of the reservoir.

In one or more embodiments of the present disclosure, a composition and method are provided to fix sand in place in a sand-producing formation by forming a solid matrix of sand and asphalt, tar, bitumen, or combination thereof, with fluid flow pathways that permit liquid and gas flow into and out of the formation. The embodiments will permit production of oil and gas. The consolidated or fixed sand product may remain in place as produced oil and gas (or water) flows through the consolidated sand—it does not dissolve once set and remains fixed in the formation.

The sand consolidation composition and method of one or more embodiments is based on reducing a viscosity of an asphaltene, bitumen, or tar mixture with other components that are in the composition (or with heat or both other components and heat), compared to a viscosity of an asphaltene, bitumen, or tar mixture alone. The method of one or more embodiments may include introducing the composition into a target formation that includes an area of under-consolidated sand in the formation. The method of one or more embodiments may include maintaining a wellbore such that solidification of the composition occurs within the formation, thereby forming a consolidated sand. As a result, a productive consolidated sand may be formed in the reservoir that is porous and permeable.

In one or more embodiments, the productive consolidated sand may have a porosity in a range of from 3 to 30%. For example, the productive consolidated sand may have a porosity in a range having a lower limit selected from any of 3%, 4%, and 5%, and an upper limit selected from any of 20%, 25%, and 30%, where any lower limit may be paired with any upper limit.

In one or more embodiments, the productive consolidated sand may have a permeability in a range of from 10 to 600 milliDarcy (mD). For example, the consolidated sand may have a permeability in a range having a lower limit selected from any of 10, 20, 30, 40, and 50 mD, and an upper limit selected from any of 400, 450, 500, 550, and 600 mD, where any lower limit may be paired with any upper limit.

In addition, thermochemical agents may be included in the composition and method of one or more embodiments to generate gas downhole and in-situ from a thermochemical reaction. This type of in-situ gas production allows foaming and the formation of foam. When the foam is incorporated into the productive consolidated sand, a three-phase (productive) consolidated sand may be formed that includes a hydrocarbon mixture (including asphaltene, bitumen, or tar), a gas, and water. Creating a foam while consolidating the sand may create a product consolidated sand that permits oil, gas, or water flow.

Composition

The sand consolidation composition includes a hydrocarbon mixture and a binding agent. The composition may include maltene, a viscosity modifying solvent, a thermochemical reagent, a foaming agent, an acid, and an emulsifier.

The hydrocarbon mixture is one or more selected from the group comprising of asphaltene, bitumen, and tar. The hydrocarbon mixture may be a heavy oil that comprises asphaltene, bitumen, or tar. The hydrocarbon mixture may further include a resin.

For example, the hydrocarbon mixture may be a heavy oil and a resin that comprises asphaltene, bitumen, or tar. The heavy oil may have an API (gravity) range of less than (<) 30°, such as <28°, <26°, <24°, or <22°.

The resin may include, but is not limited to, asphaltite, a synthetic resin including but not limited to bisphenol A diglycidyl ether, and a plant resin including but not limited to dammar and sandarac.

In one or more embodiments, the bitumen may be an oxidized bitumen.

The concentration of the asphaltene, bitumen, and tar may be from 1 to 100 gpt (gallons per thousand gallons) of the total composition. For example, the concentration of the asphaltene, bitumen, and tar may be from 1 to 90 gpt, 1 to 80 gpt, 1 to 70 gpt, 1 to gpt, or 1 to 50 gpt of the total composition.

Asphaltene in the hydrocarbon mixture may be asphalt with maltene removed. In one or more embodiments, the hydrocarbon mixture may include additional maltene that is added (that is not part of asphalt but has been removed from asphalt and added to the composition).

Maltene is the n-alkane-soluble molecular component of, for example, asphalt. Maltene may be present in a mixture that includes asphaltene, bitumen, or tar. Maltene is on average lower molecular weight than asphaltene. Additional maltene may be added to the hydrocarbon mixture of one or more embodiments, such as additional maltene that is introduced into the asphaltene, bitumen, or tar.

In one or more embodiments, the concentration of maltene may be from 1 to 100 gpt of the total composition. For example, the concentration of the maltene may be from 1 to 90 gpt, 1 to 80 gpt, 1 to 70 gpt, 1 to 60 gpt, or 1 to 50 gpt of the total composition.

In one or more embodiments, the maltene may have an average molar mass of between 300 and 400 g/mol (grams per mole). For example, the maltene may have an average molar mass in a range having a lower limit selected from any of 300, 310, 320, 330, and 340 g/mol, and an upper limit selected from any of 350, 360, 370, 380, and 390 g/mol, where any lower limit may be paired with any upper limit.

When (additional) maltene is included in the composition according to one or more embodiments, the resulting composition may have a density in a range of from 1 to 2.0 g/cm$^3$, such as from 1 to 1.9 g/cm$^3$, 1 to 1.8 g/cm$^3$, 1 to 1.7 g/cm$^3$, and 1 to 1.6 g/cm$^3$.

In one or more embodiments, the overall composition before applying to an unconsolidated sand has a viscosity of from 5 to 200 centipoise (cP), when measured at 24° C. (or room temperature, such as 20 to 25° C.) on a standard oilfield viscometer (such as a Chandler Engineering ® viscometer, Tulsa, Oklahoma, U.S.A.). This may be called an initial viscosity (different from a viscosity of a hydrocarbon mixture alone). For example, the overall composition before applying to an unconsolidated sand may have a viscosity in a range having a lower limit selected from any of 1, 2, 3, 4, and 5 cP, and an upper limit selected from any of 20, 30, 40, 50, 60, 70, 80, 90, 100, 110, 120, 130, 140, 150, 160, 170, 180, 190, and 200 cP, where any lower limit may be paired with any upper limit.

The viscosity of the composition before applying to an unconsolidated sand may be provided with heating, such as with an external heating source, before introducing the composition in the wellbore, or by including thermochemical reagents, to be described. Further, the viscosity of the composition before applying to an unconsolidated sand may be provided by including a viscosity modifying solvent in the composition. As a non-limiting example, the viscosity of tar may drop from a viscosity of 10,000 cP (tar alone) to a viscosity of 5 cP when a viscosity modifying solvent and heat is added to the tar. The resultant low viscosity hydrocarbon mixture may be a viscous foam that flows freely.

In one or more embodiments, the composition includes a viscosity modifying solvent that includes an aromatic solvent or solvent that includes an aromatic moiety (functional group). Without wanting to be bound by theory, it is believed that an aromatic solvent provides improved solubility of the hydrocarbon mixture in addition to modifying viscosity as compared to a non-aromatic solvent.

In one or more embodiments, the concentration of the viscosity modifying solvent may be from 5 to 200 gpt of the total composition. For example, the viscosity modifying solvent may be in a range having a lower limit selected from any of 1, 2, 3, 4, and 5 gpt, and an upper limit selected from any of 20, 30, 40, 50, 60, 70, 80, 90, 100, 110, 120, 130, 140, 150, 160, 170, 180, 190, and 200 gpt of the total composition, where any lower limit may be paired with any upper limit.

Suitable examples of an aromatic solvent may include, but are not limited to, xylene, benzene, toluene, isopropylbenzene, decalin, tetralin (1,2,3,4-tetrahydronaphthalene), methylnaphthalenes, diesel, and diesel fuel.

A hydrocarbon mixture with a viscosity modifying solvent may flow freely, meaning that the mixture is pourable at room temperature (20° C. to 25° C.).

In one or more embodiments, the composition includes a binding agent, such as an amino silane. The binding agent links (physically binds or binds by chemical association or covalently binds by chemical bonds) asphaltenes in the hydrocarbon mixture with sand particles present in the formation.

An amino silane has a silicon atom moiety that is a useful binding agent with sand. The amino silane may interact or bind between the silicon found in a sand grain and the amino silane. The amino silane also has an amine group that may provide covalent bonding with moieties on the asphaltenes.

A suitable example of the amino silane binding agent includes, but is not limited to, aminopropyltriethoxysilane.

In one or more embodiments, the amino silane binding agent may be in a weight of from 0.5 to 10 gpt of the total composition. For example, the amino silane binding agent may be in a range having a lower limit selected from any of 0.5, 0.6, 0.7, 0.8, 0.9, and 1.0 gpt, and an upper limit selected from any of 5, 6, 7, 8, 9, and 10 gpt, where any lower limit may be paired with any upper limit.

In one or more embodiments, the average molecular weight of the amino silane is in a range of from 30 to 60 g/mol. For example, the amino silane may be in a range having a lower limit selected from any of 30, 32, 34, 36, 38, 40, 42, and 43 g/mol, and an upper limit selected from any of 45, 46, 48, 50, 52, 54, 56, 58, and 60 g/mol, where any lower limit may be paired with any upper limit.

The composition of one or more embodiments may be called an "adsorption system" because the binding agent is used to chemically adhere, adsorb, or bond the hydrocarbon mixture to sand or silica.

In one or more embodiments, the composition includes a thermochemical reagent that generates gas in-situ upon reaction. The reaction of a thermochemical reagent may occur downhole and may release nitrogen, carbon dioxide, or other suitable gas.

Examples of thermochemical reagent include, but are not limited to, sodium nitrite and an ammonium salt. In addition to nitrogen gas, water, heat, and additional salt, such as sodium chloride, may be produced in a reaction between sodium nitrite and ammonium salt. Equation 1 shows a general formula (example) of the sodium nitrite and ammonium salt reaction.

$$NH_4R+NaNO_2 \rightarrow N_2 \text{ (gas)}+NaR+H_2O+\text{Heat} \quad \text{Equation 1:}$$

In equation 1, the ammonium salt is "$NH_4R$." R may be hydroxide, chloride, bromide, nitrate, nitrite, sulfate, carbonate. Thus, the ammonium salt may be one or more selected from the group consisting of ammonium hydroxide, ammonium chloride, ammonium bromide, ammonium nitrate, ammonium nitrite, ammonium sulfate, and ammonium carbonate. Equation 1 is a simplified formula, where "R" is shown to be a monovalent anion. One of ordinary skill in the art would appreciate that where "R" is not a monovalent species, then the stoichiometry of the reaction may change accordingly.

The thermochemical reagent(s) may be provided in a concentration range of from 0.1 to 10 Molar (M) in the overall composition. For example, the thermochemical reagent(s) may be provided in a concentration range having a lower limit of from 0.1, 1, 2, 3, 4, 5, 6, 7, 8, and 9 M, and an upper limit of from 1, 2, 3, 4, 5, 6, 7, 8, 9, and 10 M, where any lower limit may be paired with any mathematically allowed upper limit.

The heat generated from a reaction of a thermochemical reagent downhole may allow the reaction rate between a binding agent and the hydrocarbon mixture to proceed faster, compared to a composition without a thermochemical reagent. The heat generated from a reaction of thermochemical reagents downhole may also evaporate low-boiling temperature chemicals and solvents.

In one or more embodiments, the composition may include an emulsifier. An emulsifier is a chemical additive that creates an emulsion, which is a dispersion of one immiscible liquid into another, by reducing the interfacial tension between the two liquids to achieve stability.

Suitable examples of emulsifier include, but are not limited to, anionic surfactants; fatty acids; cationic surfactants; nonionic surfactants, such as glycerin fatty acid esters and sugar esters; and amphoteric surfactants, such as lecithin, xanthan gum, guar gum, carboxymethyl cellulose, polyvinyl alcohol, and sodium polyacrylate.

The emulsifier may be in a range of from about 10 gpt to about 200 gpt, such as from 10 to 200 gpt in the overall composition. For example, the emulsifier may be in a range having a lower limit selected from any of 10, 11, 12, 13, 14, 15, 16, 17, 18, or 19 gpt, and an upper limit selected from any of 21, 25, 75, 100, 125, 150, 175, and 200 gpt, where any lower limit may be paired with any upper limit.

In one or more embodiments, the composition may include a foaming agent. The foaming agent is an additive used in preparation of foam, such as a fluid containing air or gas bubbles. The foaming agent may provide a source of gas that is released in-situ. The foaming agent is different from the thermochemical reagent(s) because the foaming agent does not increase the temperature to an extent that the reaction rate between hydrocarbon mixture and binding agent may increase. On the other hand, the thermochemical reagent(s) increase the temperature to an extent that the reaction rate between hydrocarbon mixture and binding agent may increase.

Suitable examples of a foaming agent include, but are not limited to, one or more selected from sodium bicarbonate, a betaine (for example, hydroxysulfobetaine), and a hydroxysultaine. As a non-limiting example, sodium bicarbonate may release carbon dioxide in the presence of an acid.

The foaming agent may be included in a range of from about 10 gpt to about 300 gpt, such as from 10 to 300 gpt in the overall composition. For example, the foaming agent may be in a range having a lower limit selected from any of 10, 11, 12, 13, 14, 15, 16, 17, 18, or 19 gpt, and an upper limit selected from any of 21, 25, 75, 100, 125, 150, 175, 200, 225, 250, 275, and 300 gpt, where any lower limit may be paired with any upper limit.

In one or more embodiments, the composition may include an acid. The acid may provide an overall composition pH of from 0.1 to 10 pH. For example, the pH of the composition may be in a range having a lower limit selected from any of 0.1, 1, 2, 3, 4, 5, 6, 7, 8, and 9 pH, to an upper limit selected from any of 1, 2, 3, 4, 5, 6, 7, 8, 9, and 10 pH, where any lower limit may be paired with any mathematically allowed upper limit. Suitable examples of acid may include hydrochloric acid, acetic acid, nitric acid, citric acid, and a combination thereof. The acid may be included in a range of from about 10 gpt to about 300 gpt, such as from 10 to 300 gpt in the overall composition.

In one or more embodiments, the composition includes a surfactant. In one or more embodiments, the composition may include multiple surfactants. A surfactant is a chemical that may adsorb at an interface, lowering the surface tension or interfacial tension between two fluids or between a fluid and a solid. The surfactant may enhance foam stability as compared to a composition without a surfactant.

Suitable examples of a surfactant include a gemini surfactant. A gemini (dimeric) surfactant may generally be described as two surfactant molecules that are covalently bonded together, or a dimer of two surfactant molecules that are chemically bonded by a spacer. A suitable gemini surfactant includes, but is not limited to, a cationic gemini surfactant such as bis[2-hydroxy-3-(dodecyldimethylammonio)propyl]-isopropyl amine dichloride. In one or more embodiments, when a gemini surfactant is included in the composition, resultant consolidation (of sand) is improved compared to a composition that does not include a gemini surfactant.

Other suitable surfactants include, but are not limited to, aluminum carboxylate, cetyltrimethylammonium chloride, sodium dodecyl sulfate, cetyltrimethylammonium salicylate, and cetylpyridinium salicylate.

In one or more embodiments, the concentration of the surfactant may be from about 0.1 to about 10 gpt of the total composition. For example, the concentration of the surfactant may be in a range having a lower limit selected from any of 0.1, 0.2, 0.3, 0.4, 0.5, 0.6, 0.7, 0.8, 0.9, and 1.0 gpt, and an upper limit selected from any of 3, 4, 5, 6, 7, 8, 9, and 10 gpt, where any lower limit may be paired with any upper limit.

In one or more embodiments, the composition includes a nanoparticle. The nanoparticle may improve sand consolidation and foam stability compared to a composition without a nanoparticle. In addition, a composition of one or more embodiments that include a nanoparticle may enhance reservoir permeability and limit sand production compared to a composition without a nanoparticle. Without wanting to be bound by theory, a nanoparticle according to embodiments herein may act as a bridging material between sand grains present in the reservoir.

Suitable examples of a nanoparticle include, but are not limited to, graphene, carbon nanotubes, and silica such as fumed silica.

The nanoparticle may be included in a range of from about 0.01 weight percent (wt %) to about 5 wt % of the total composition weight. The nanoparticle may be in a concentration range having a lower limit of any of 0.01, 0.02, 0.03, 0.04, 0.05, 0.06, 0.07, 0.08, and 0.09 wt %, and an upper limit of any of 0.1, 0.15, 0.2, 0.4, 0.6, 0.8, 1, 1.5, 2, 2.5, 3, 3.5, 4, 4.5 and 5 wt %, where any lower limit may be paired with any upper limit.

In one or more embodiments, the size of the nanoparticle may be from 1 nanometer (nm) to 400 nm, such as from 1 nm to 350 nm, 1 nm to 300 nm, 1 nm to 250 nm, 1 nm to 200 nm, 1 nm to 150 nm, or 1 nm to 100 nm.

Method

In one or more embodiments, a method for sand consolidation is provided. The method may include reducing the viscosity of a hydrocarbon mixture by combining (mixing) with the composition of one or more embodiments. The hydrocarbon mixture may include one or more selected from the group consisting of asphaltene, bitumen, and tar. The composition is as previously discussed and may further include, for example, an emulsifier, a foaming agent and an acid, a surfactant, a nanoparticle, or a combination thereof.

The viscosity of the composition before applying to an unconsolidated sand may be in a range from about 5 to 200 cP, as previously described. Obtaining this viscosity may occur by introducing a viscosity modifying solvent, by heating with a heat source, or both. A heat source may be an exothermic reaction, such as may occur with a reaction of a thermochemical, or a heating element. In one or more embodiments, the heat source is a thermochemical reaction. The heat source may heat the composition to a temperature from 37 to 260° C. (100 to 500° F.), which is sufficient to reduce the viscosity of the composition from its original viscosity according to one or more embodiments. When the composition is not heated, a viscosity modifying solvent may be included.

The method may include introducing the composition of one or more embodiments into a target formation. The method may be applied to several different well types including but not limited to production wells and water injection wells. The wellbore traverses a target formation including under-consolidated sand. Upon introduction, the composition contacts the under-consolidated the in the target formation. The low viscosity of the mixture (initial viscosity of composition) allows the composition to reach the target formation. The composition may be a viscous (liquid based) foam that carries the hydrocarbon mixture as part of the foam, thereby allowing the composition to squeeze through holes, cracks, and openings in the target formation.

The method may include introducing thermochemical reagents into the target formation. The thermochemical reagents are allowed to mix and interact with each other downhole, and with the composition of one or more embodiments. Gas that is generated in-situ with the thermochemical reagents (or a foaming agent) creates foam and bubbles in the composition. As the gas is generated in-situ and intermingles with the composition, the composition expands (or foams and expands) the treated area of the target formation by a factor in a range of from about 2 to 10 times (volumetric expansion) compared to a composition without thermochemical reagents (or a foaming agent). The in-situ gas generation allows for a porous and permeable consolidated sand product to form while using less overall volume of the composition.

The composition may be introduced into the wellbore with coiled tubing to avoid cooling of the composition during introduction or premature reaction of thermochemical reagents. For example, when thermochemical reagents are introduced, one mixture (such as sodium nitrite, foaming agent, and emulsifier) may be pumped through a conduit, such as coiled tubing, into the wellbore. Another mixture (such as ammonium chloride, solvents, acid, and hydrocarbon mixture) may be pumped through coiled tubing-annulus. In this example, both mixtures of the composition may be pumped simultaneously such that they intermingle downhole and enter the target formation together.

As another option, the composition of one or more embodiments may be mixed on the fly and introduced by bullheading. The components of the composition may also be introduced downhole in series.

In one or more embodiments, the composition may be introduced into the formation (sand bearing formation) such that it penetrates the formation at distance in a range of from 0.3 to 3 meters (1 to 10 feet) from the face of the wellbore wall. When the composition is introduced at a distance into the formation of less than 0.3 meters or greater than 3 meters, then the composition may still provide one or more effects of the method, which is to form a consolidated sand and a productive consolidated sand.

The method may include maintaining the wellbore (including the wellbore and target formation, conditions therein, etc.) such that the viscosity of the composition mixed with sand increases and forms a consolidated sand. Maintaining the wellbore may include shutting in the well for 3 to 24 hours, and at a pressure in a range from about 6900 to 41400 kPa (kilopascals) (about 1000 to 6000 pounds per square inch (psi)). The temperature of the formation may be in a range from about 37 to 150° C. (100 to 300° F.). After a period, productive consolidated sand is formed that is porous and permeable. Productive consolidated sand is a solidified porous and permeable foam (semi-solid or solid foam product) that includes the composition having a hydrocarbon mixture of asphaltene, bitumen, or tar, and a binding agent. Once the productive consolidated sand is formed, drilling operations may resume.

Product

The productive consolidated sand (or consolidated sand product or product) is a combination of formation sand and the composition of one or more embodiments having a hydrocarbon mixture (asphaltene, bitumen, or tar) and a binding agent. The components of the productive consolidated sand are bound by a binding agent. Such binding occurs between sand (silica) and asphaltene via the binding agent, through chemical interaction and bonding, not limited to covalent bonding.

The productive consolidated sand has a porosity and a permeability that allows the flow of fluid through the pores of the structure. The product is a solid (hard, rigid), polymer-like or cross-linked foam having three phases: a hydrocarbon phase (from the hydrocarbon mixture), a water phase, and a gas phase (gas within the foam bubbles). Produced oil and gas may flow through the productive consolidated sand.

The porosity of the productive consolidated sand may range from 2% to 20%, such as in a range having a lower limit selected from any of 2%, 3%, 4%, and 5%, and an upper limit selected from any of 15%, 16%, 17%, 18%, 19%, and 20%, where any lower limit may be paired with any upper limit.

The permeability of the productive consolidated sand may range from 5 to 500 mD, such as in a range having a lower limit selected from any of 5, 6, 7, 8, 9, and 10 mD, and an upper limit selected from any of 400, 420, 440, 460, 480, and 500 mD, where any lower limit may be paired with any upper limit.

Examples

An example laboratory scale composition is as follows. Components of the composition were added to a 1 L graduated cylinder in the following order: (1) 20 mL of sodium nitrite (6 molar)+3 mL of foaming agent+0.5 g nanoparticle (Aerosil® Fumed Silica (Evonik, Essen, Germany))+1 mL emulsifier; (2) 20 mL of ammonium chloride (6 molar); and (3) 5 mL asphaltene. The components were mixed in the graduated cylinder and then 5 mL acetic acid (99%) was added to the mixture.

The composition was then mixed with sand and set at a temperature of 93° C. (200° F.) for 2 hours. A hardened consolidated sand product was formed. The cured material was retrieved as a productive consolidated sand.

Other components may have included the following components and concentrations: up to 5 gpt of polymer or guar; up to 3 gpt of surfactant; up to 9 molar sodium nitrite; up to 6 molar of ammonium chloride; 1-50 gpt of foaming agent; up to 5 gpt of nanoparticle; up to 5 gpt of foam stabilizer; and up to 20 volume % of acetic acid.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the words "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it should be understood that another one or more embodiments is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. A sand consolidation composition, comprising:
   a hydrocarbon mixture comprising:
   asphaltene, bitumen, or tar;
   a binding agent, and
   a viscosity modifying solvent and a thermochemical reagent,
   where the binding agent is an amino silane,
   where the composition has a viscosity ranging from 5 to 200 cP at 20 to 25° C., and
   where the thermochemical reagent comprises sodium nitrite and ammonium chloride.

2. The composition of claim 1, where the hydrocarbon mixture further comprises one or more selected from the group consisting of heavy oil, resin, and maltene.

3. The composition of claim 1, where the binding agent is aminopropyltriethoxysilane.

4. The composition of claim 1, where the viscosity modifying solvent comprises one or more aromatic solvents or a solvent that includes an aromatic moiety selected from the group consisting of xylene, benzene, toluene, isopropylbenzene, decalin, tetralin, methylnaphthalenes, diesel, and diesel fuel.

5. The composition of claim 1, further comprising an emulsifier that is one or more selected from the group consisting of an anionic surfactant, a fatty acid, a cationic surfactant, a nonionic surfactant, and an amphoteric surfactant.

6. The composition of claim 1, further comprising a foaming agent that is sodium bicarbonate, and an acid.

7. The composition of claim 1, further comprising a gemini surfactant.

* * * * *